(12) United States Patent
Mashimo (10) Patent No.: US 12,155,226 B2
(45) Date of Patent: Nov. 26, 2024

(54) POWER TRANSMISSION APPARATUS, CONTROL METHOD EXECUTED BY POWER TRANSMISSION APPARATUS, AND STORAGE MEDIUM

(71) Applicant: CANON KABUSHIKI KAISHA, Tokyo (JP)

(72) Inventor: Hiroshi Mashimo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/718,911

(22) Filed: Apr. 12, 2022

(65) Prior Publication Data

US 2022/0247223 A1    Aug. 4, 2022

Related U.S. Application Data

(63) Continuation of application No. 16/853,056, filed on Apr. 20, 2020, now Pat. No. 11,329,512.

(30) Foreign Application Priority Data

Apr. 24, 2019    (JP) ................................ 2019-083243

(51) Int. Cl.
     *H02J 50/12*      (2016.01)
     *H02J 7/02*      (2016.01)
     *H02J 50/80*      (2016.01)

(52) U.S. Cl.
     CPC ............... *H02J 50/12* (2016.02); *H02J 7/02* (2013.01); *H02J 50/80* (2016.02)

(58) Field of Classification Search
CPC ..... H02J 50/12; H02J 7/02; H02J 50/80; H02J 50/10
See application file for complete search history.

(56) References Cited

U.S. PATENT DOCUMENTS

| | | | | |
|---|---|---|---|---|
| 9,507,969 B2* | 11/2016 | Chu | ................ | G07F 15/10 |
| 9,525,209 B2* | 12/2016 | Tanabe | ................ | H02J 50/12 |
| 9,997,927 B2* | 6/2018 | Eguchi | ................ | H02J 50/12 |
| 10,128,696 B2* | 11/2018 | Iwasaki | ................ | H02J 50/60 |
| 10,849,577 B2* | 12/2020 | Okumura | ................ | A61B 6/486 |
| 10,965,171 B2* | 3/2021 | Tanabe | ................ | H02J 50/60 |
| 10,985,615 B2* | 4/2021 | Park | ................ | H02J 50/70 |
| 2010/0066305 A1* | 3/2010 | Takahashi | ................ | H01M 10/44 320/108 |

(Continued)

FOREIGN PATENT DOCUMENTS

| | | |
|---|---|---|
| JP | 2016214023 A | 12/2016 |
| JP | 2017184488 A | 10/2017 |

*Primary Examiner* — Jared Fureman
*Assistant Examiner* — Michael J Warmflash
(74) *Attorney, Agent, or Firm* — Canon U.S.A., Inc., IP Division (57) ABSTRACT

When a communication unit receives an end power transfer (EPT) packet including information about a power transmission stop period from a power reception apparatus, a power transmission apparatus controls a power transmission coil to transmit a checking signal for checking existence of the power reception apparatus during the power transmission stop period, detects at least one of a voltage or a current applied to the power transmission coil when the checking signal is transmitted, and determines whether the power reception apparatus that has transmitted the EPT packet exists, based on the detection result.

16 Claims, 6 Drawing Sheets

(56) References Cited

U.S. PATENT DOCUMENTS

| | | | |
|---|---|---|---|
| 2011/0188421 A1* | 8/2011 | Nakahara | H04W 52/02 |
| | | | 370/311 |
| 2015/0155746 A1* | 6/2015 | Mashimo | H04B 5/79 |
| | | | 307/104 |
| 2016/0190852 A1* | 6/2016 | Chiang | G01V 3/088 |
| | | | 320/108 |
| 2016/0336976 A1* | 11/2016 | Onishi | H04B 1/0475 |
| 2017/0033613 A1* | 2/2017 | Takahashi | H02J 50/12 |
| 2017/0149290 A1* | 5/2017 | Onishi | H02J 50/90 |
| 2017/0163093 A1* | 6/2017 | Akuzawa | H02J 50/402 |
| 2018/0262061 A1* | 9/2018 | Tanabe | H04B 5/79 |
| 2019/0214852 A1* | 7/2019 | Park | H02M 3/33571 |

\* cited by examiner

POWER TRANSMISSION APPARATUS, CONTROL METHOD EXECUTED BY POWER TRANSMISSION APPARATUS, AND STORAGE MEDIUM

CROSS-REFERENCE TO RELATED APPLICATIONS

The present application is a continuation of U.S. patent application Ser. No. 16/853,056, filed on Apr. 20, 2020, which claims priority from Japanese Patent Application No. 2019-083243 filed Apr. 24, 2019, which are hereby incorporated by reference herein in their entireties.

BACKGROUND

Field

The present disclosure relates to a power transmission apparatus, a control method executed by the power transmission apparatus, and a storage medium.

Description of the Related Art

In recent years, a wireless power transfer system such as a wireless charging system has been developed extensively. Japanese Patent Application Laid-Open No. 2015-165761 discusses a power transfer apparatus and a power reception apparatus compliant with a standard (hereinafter, called as "WPC standard") established by a standard-setting organization of a wireless charging system, the Wireless Power Consortium (WPC). Japanese Patent Application Laid-Open No. 2015-165761 further discusses a technique in which a signal indicating a stop of power transmission is transmitted when the power reception apparatus detects abnormality.

Using the above-described signal indicating a stop of power transmission, a power transmission stop period can be specified. More specifically, information specifying a power transmission stop period can be contained in the signal indicating a stop of power transmission. If the power transmission apparatus receives the signal, indicating a stop of power transmission, containing the information specifying a power transmission stop period, the power transmission apparatus stops power transmission during the specified power transmission stop period. Accordingly, transmission of a signal for detecting an object may also not be transmitted. In this case, even if the power reception apparatus placed on the power transmission apparatus is removed from the power transmission apparatus during the power transmission stop period, the removal of the power reception apparatus cannot be detected until after the power transmission stop period has passed. Consequently, it may take time to detect the removal of the power reception apparatus.

SUMMARY

Various embodiments of the present disclosure are directed to a technique for enabling a power transmission apparatus that receives a power transmission stop signal specifying a power transmission stop period to detect removal of a power reception apparatus even during a period when power transmission is stopped.

According to one embodiment of the present disclosure, a power transmission apparatus includes an antenna configured to wirelessly transmit power to a power reception apparatus, a receiving unit configured to receive a signal from the power reception apparatus, a detection unit configured to detect at least one of a voltage or a current applied to the antenna, and a control unit configured to control the antenna, based on reception of a signal from the power reception apparatus, the signal indicating a stop of power transmission and including information about a power transmission stop period, to transmit a checking signal for checking existence of the power reception apparatus that has transmitted the signal indicating a stop of power transmission, during the power transmission stop period, wherein the detection unit detects at least one of a voltage or a current applied to the antenna when the checking signal is transmitted, and wherein the control unit determines whether the power reception apparatus that has transmitted the signal indicating a stop of power transmission exists, based on a detection result acquired by the detection unit.

Further features will become apparent from the following description of example embodiments with reference to the attached drawings.

DESCRIPTION OF THE EMBODIMENTS

Hereinafter, an example embodiment of the present disclosure will be described with reference to the appended drawings. The below-described example embodiment is merely an example for describing a technical spirit of the present disclosure, and thus the present disclosure should not be limited to the configuration and the method described in the present example embodiment.

Figure 3:
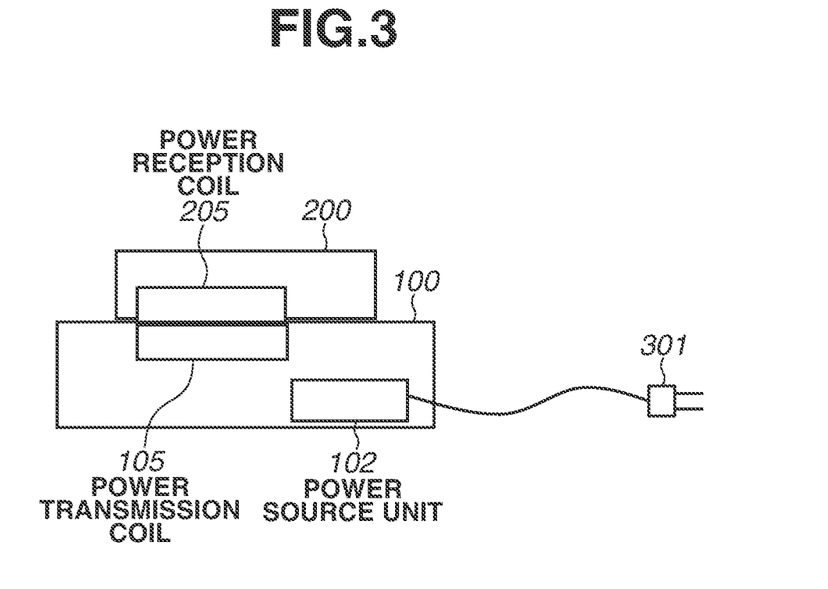
FIG. 3 is a diagram illustrating an example of a wireless power transfer system according to one example embodiment.

FIG. 3 is a diagram illustrating a configuration example of a wireless charging system (wireless power transfer system) according to the present example embodiment. The system includes a power transmission apparatus and a power reception apparatus. Hereinafter, the power transmission apparatus may be called as "TX", and the power reception apparatus may be called as "RX". A TX 100 is an electronic apparatus which wirelessly transmits power to an RX 200 placed on a charging table of the TX 100. The RX 200 is an electronic apparatus which receives power wirelessly transmitted from the TX 100 to charge a battery built in the RX 200. Hereinafter, a configuration in which the RX 200 is placed on the charging table will be described as an example. However, as long as the RX 200 exists within a range where the TX 100 can transmit power to the RX 200, the RX 200 does not have to be placed on the charging table when power is transmitted from the TX 100 to the RX 200.

The TX 100 receives power from a commercial power source via an alternate-current (AC) connector 301, and the received power is supplied to a power source unit 102. The RX 200 receives power from a power transmission coil 105 of the TX 100 via a power reception coil 205 included in the RX 200. The power received by the RX 200 is charged to a battery (not illustrated). Each of the power transmission coil 105 and the power reception coil 205 is a type of antenna. While, hereinafter, a coil will be described as an example of the antenna, a non-coil shaped antenna can be also used instead of using the power transmission coil 105 or the power reception coil 205.

Each of the TX 100 and the RX 200 may include a function for executing an application other than the wireless charging application. A smartphone is an example of the RX 200, and an accessory device for charging the smartphone is an example of the TX 100. Each of the TX 100 and the RX 200 may be a storage apparatus such as a hard disk apparatus or a memory apparatus, or may be an information processing apparatus such as a personal computer (PC). For example, each of the TX 100 and the RX 200 may be an image input apparatus such as an image-capturing apparatus (a camera or a video camera), or may be an image output apparatus such as a printer, a copy machine, and a projector. The TX 100 may be a smartphone. In this case, the RX 200 may be another smartphone or a wireless headset. The RX 200 may be an automobile, and the TX 100 may be a charging device installed in a console inside the automobile.

Further, although one RX 200 and one TX 100 are described in the present example embodiment, the example embodiment is applicable to a configuration in which power is transmitted to a plurality of RXs 200 from a single TX 100 or separate TXs 100.

The system executes wireless power transfer employing an electromagnetic induction method compliant with the WPC standard to execute wireless charging operation. In other words, the RX 200 and the TX 100 execute wireless power transfer between the power reception coil 205 of the RX 200 and the power transmission coil 105 of the TX 100 to execute wireless charging operation compliant with the WPC standard. In addition, the wireless power transfer method (non-contact power transfer method) employed in the system is not limited to the method specified by the WPC standard, and another electromagnetic induction method, a magnetic resonance method, an electric field resonance method, a microwave method, or a laser method can be also employed. While, in the present example embodiment, the wireless power transfer is executed for the purpose of wireless charging operation, the wireless power transfer method may be used for the purpose different from the purpose of wireless charging operation.

In the WPC standard, an amount of power guaranteed when the RX 200 receives power from the TX 100 is specified by a value called "Guaranteed Power" (hereinafter, called as "GP"). The GP represents a value of power guaranteed to be output to a load of the RX 200 such as a charging circuit, even if the power transmission efficiency between the power reception coil 205 and the power transmission coil 105 is lowered because of a change of a positional relationship between the RX 200 and the TX 100. For example, when the GP is 5 W, even if the power transmission efficiency is lowered by a change of the positional relationship between the power reception coil 205 and the power transmission coil 105, the TX 100 controls the power transmission coil 105 to transmit power, so that power of 5 W can be output to the load inside the RX 200.

The RX 200 and the TX 100 according to the present example embodiment execute communication compliant with the WPC standard to execute power transmission/reception control. In the WPC standard, phases including a Power Transfer phase in which power transfer is executed and phases before executing actual power transfer are specified, and communication necessary for the power transmission/reception control is executed at each of the phases. The phases before executing the power transfer include a Selection phase, a Ping phase, an Identification and Configuration phase, a Negotiation phase and a Calibration phase. Hereinafter, the Identification and Configuration phase is called as "I & C phase".

In the Selection phase, the TX 100 intermittently transmits an Analog Ping to detect placement of an object on the charging table (e.g., placement of the RX 200 or a conductor strip on the charging table). In other words, the Analog Ping is a detection signal for detecting existence of the object. The TX 100 transmits the Analog Ping by applying a voltage or a current to the power transmission coil 105. The voltage or the current applied to the power transmission coil 105 changes between a case in which an object is placed on the charging table and a case in which an object is not placed on the charging table. Therefore, the TX 100 detects at least any one of the values of the voltage and the current applied to the power transmission coil 105 when the Analog Ping is transmitted. Then, the TX 100 determines that the object exists if a detected voltage value is less than a threshold value or a detected current value is greater than the threshold value, and shifts to the Ping phase.

In the Ping phase, the TX 100 transmits a Digital Ping having the power greater than the power of the Analog Ping. The power of the Digital Ping is sufficient for activating the control unit of the RX 200 placed on the charging table. The RX 200 notifies the amount of receiving voltage to the TX 100. In other words, the RX 200 transmits a Signal Strength packet (hereinafter, called as "SS packet") to the TX 100. By the above processing, the TX 100 recognizes that the object detected in the Selection phase is the RX 200 by receiving a response from the RX 200 that has received the Digital Ping. The TX 100 receives the notification about the received voltage value and shifts to the I & C phase.

In the I & C phase, the TX 100 identifies the RX 200 and acquires device configuration information (capacity information) from the RX 200. Therefore, the RX 200 transmits an ID packet and a Configuration packet to the TX 100. Identification information of the RX 200 is included in the ID packet, and the device configuration information (capacity information) of the RX 200 is included in the Configuration packet. The TX 100 receives the ID packet and the Configuration packet and transmits an acknowledgement (ACK) in response thereto. Then, the I & C phase is ended.

In the Negotiation phase, a value of GP is determined based on the value of GP requested from the RX 200 and power transmission capacity of the TX 100.

In the Calibration phase, based on the WPC standard, the receiving voltage value of the RX 200 is notified to the TX 100, and the TX 100 executes adjustment for efficiently transmitting power.

In the Power Transfer phase, control of starting and continuing power transmission and control of stopping power transmission in response to an error or a full-charged state are executed.

The TX 100 and the RX 200 execute communication for the above-described power transmission/reception control by the communication compliant with the WPC standard (hereinafter, called as "first communication"), in which a signal is superimposed on the transmission power using the antennas or the coils the same as those used for wireless power transfer. A range in which the TX 100 and the RX 200 can execute the first communication based on the WPC standard is similar to a range in which the TX 100 can transmit power.

The RX 200 according to the present example embodiment may execute device authentication of the TX 100 by executing challenge-response communication using an electronic certificate with the TX 100. More specifically, the TX 100 and the RX 200 execute communication for device authentication. The device authentication may be executed before the Negotiation phase. In this case, a result of the device authentication can be reflected in the Negotiation phase. Specifically, the processing will be executed as follows.

The RX 200 requests the TX 100 which has succeeded in the device authentication to set the GP to 15 W, and requests the TX 100 which has failed in the device authentication to set the GP to 5 W. In addition, a combination of the values of the GP is not limited to 15 W and 5 W, and any combination thereof is possible as long as the value of the GP when the TX 100 has succeeded in device authentication is greater than the value thereof when the TX 100 has failed in device authentication. In other words, the RX 200 requests power transmission/reception to be executed at a large GP value only when the TX 100 has succeeded in device authentication. As described above, because the GP is determined based on a result of device authentication, power can be received at a large GP value only from the TX 100 which has passed a predetermined testing specified by the WPC standard, and is recognized as the TX 100 capable of transmitting power at a large GP value. Examples of the case where the device authentication is not successful include cases where the TX 100 does not have a function for executing device authentication, or where the TX 100 has the function but has failed in the device authentication.

The device authentication may be executed after the Negotiation phase. For example, the device authentication may be executed in the Power Transfer phase. In this case, in order to reflect a result of the device authentication on the GP, the TX 100 and the RX 200 shift to a Renegotiation phase, determine the GP again, and shift to the Power Transfer phase again. Device authentication may also be executed concurrently with the phase before the Power Transfer phase such as the Selection phase.

Communication for the device authentication may be executed by the first communication using the antenna (or the coil) the same as the antenna (or the coil) used for wireless power transfer, or may be executed by communication using an antenna (or a coil) and a frequency different from those used for the wireless power transfer (hereinafter, called as "second communication"). Herein, in the second communication, communication can be executed at a speed higher than that of the first communication. Specifically, a frequency range of the electromagnetic wave used for the second communication is higher than that of the electromagnetic wave used for the first communication.

In the present example embodiment, communication executed by a communication method compliant with a standard of the Bluetooth (registered trademark) Low Energy (hereinafter, called as "BLE") will be described as an example of the second communication. While, according to the present example embodiment, the TX 100 plays a role of a Peripheral in the BLE and the RX 200 plays a role of a Central in the BLE, these roles in the BLE can be reversed. The second communication may be executed by another communication method such as a wireless local area network (LAN) compliant with a standard of the Institute of Electrical and Electronics Engineers (IEEE) 802.11 series (e.g., Wi-Fi (registered trademark)), the ZigBee, or the Near Field Communication (NFC).

<Configuration of Apparatus>

Configurations of the power transmission apparatus (TX 100) and the power reception apparatus (RX 200) according to the present example embodiment will be described. The below-described configurations are merely an examples. Therefore, in some cases, all or a part of the configurations described hereinafter may be omitted or replaced with the other configurations having similar functions, or another configuration may be further added to the configurations described below. Furthermore, a block described below may be divided into a plurality of blocks, or a plurality of blocks may be integrated into a single block.

Figure 1:
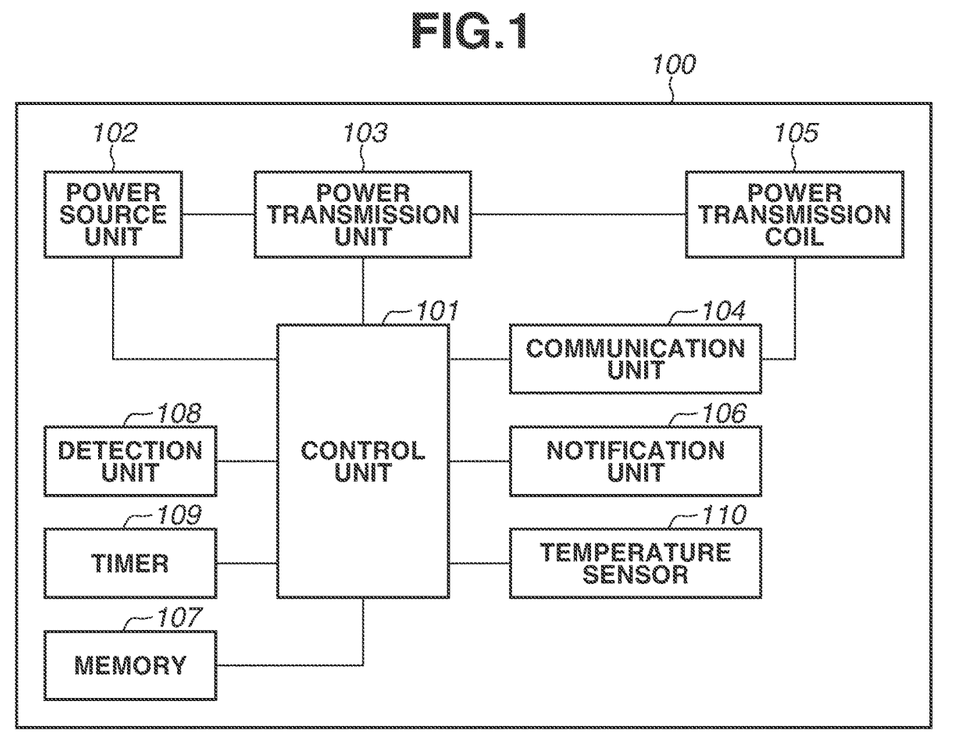
FIG. 1 is a block diagram illustrating a configuration example of a power transmission apparatus according to one example embodiment.

FIG. 1 is a block diagram illustrating a configuration example of the TX 100 of the present example embodiment. The TX 100 includes a control unit 101, a power source unit 102, a power transmission unit 103, a communication unit 104, a power transmission coil 105, a notification unit 106, a memory 107, a detection unit 108, a timer 109, and a temperature sensor 110. In addition to the above-described constituent elements, the TX 100 may further include an authentication unit for executing device authentication.

Hereinafter, a configuration in which the communication unit 104 executes the first communication by using the power transmission coil 105 will be described as an example. However, the present example embodiment is not limited thereto. Alternatively, the TX 100 may have a communication antenna for the above described second communication and execute the second communication. Communication for power transmission/reception control may be included in the communication by the communication unit 104. The communication unit 104 may also execute communication for device authentication.

For example, the control unit 101 controls the entirety of the TX 100 by executing a control program stored in the memory 107. In other words, the control unit 101 controls the respective units illustrated in FIG. 1. The control unit 101 may execute control for executing an application other than the wireless power transfer application. For example, the control unit 101 includes one or more processors such as a central processing unit (CPU) and a micro processing unit (MPU). The control unit 101 may include hardware dedicated to specific processing such as an application specific integrated circuit (ASIC). Further, the control unit 101 may include an array circuit such as a field programmable gate array complied to execute predetermined processing. The control unit 101 stores information that should be stored while executing the various types of processing in the memory 107. The control unit 101 measures time by using the timer 109.

The power source unit 102 supplies power necessary for the control unit 101 to control the entirety of the TX 100 and to execute power transmission and communication. The power source unit 102 converts power supplied from the outside of the TX 100, e.g., a commercial power source, to power of the required voltage and supplies the power to the entirety of the TX 100. The power source unit 102 may be a battery. The battery is charged with power supplied from the commercial power source.

The power transmission unit 103 converts direct-current power or alternate-current power received from the power source unit 102 to alternate-current frequency power of a frequency range used for wireless power transfer, and generates an electromagnetic wave for transmitting power to the RX 200 by inputting the alternate-current frequency power to the power transmission coil 105. For example, the frequency of the alternate-current power generated by the power transmission unit 103 is approximately several-hundred kHz (e.g., 110 kHz to 205 kHz). This frequency is different from the communication frequency of the BLE (e.g., 2.4 GHz) for the second communication. Based on the instruction from the control unit 101, the power transmission unit 103 inputs the alternate-current frequency power to the power transmission coil 105 to cause the power transmission coil 105 to output the electromagnetic wave for transmitting power to the RX 200. The power transmission unit 103 adjusts the intensity of the electromagnetic wave to be output by adjusting any one or both of the voltage (power transmission voltage) and the current (power transmission current) input to the power transmission coil 105. The intensity of the electromagnetic wave is increased when the power transmission voltage or the power transmission current is increased, and the intensity thereof is reduced when the power transmission voltage or the power transmission current is reduced. Based on the instruction from the control unit 101, the power transmission unit 103 executes output control of the alternate-current frequency power to start or stop the power transmitted from the power transmission coil 105.

Specifically, the power transmission unit 103 converts the voltage supplied from the power source unit 102 to an alternate voltage by a half-bridge or a full-bridge switching circuit using a field-effect transistor (FET). The power transmission unit 103 further includes a gate driver for controlling ON/OFF states of the FET.

The communication unit 104 executes control communication compliant with the above-described WPC standard with the RX 200. The communication unit 104 modulates the electromagnetic wave output from the power transmission coil 105 and transfer the information to the RX 200 to execute the first communication. The communication unit 104 demodulates the electromagnetic wave that is output from the power transmission coil 105 and modulated by the RX 200 to acquire the information transmitted by the RX 200. In other words, in the first communication executed by the communication unit 104, information is superimposed on the electromagnetic wave transmitted from the power transmission coil 105.

Further, the communication unit 104 may execute the second communication by using a communication antenna (not illustrated). As described above, in the second communication, communication is executed at a speed higher than that of the first communication. Specifically, a frequency range of the electromagnetic wave for the second communication is higher than that of the electromagnetic wave for the first communication. The communication unit 104 may have a modulation/demodulation circuit or a communication protocol processing function necessary for executing communication compliant with the BLE standard.

The communication unit 104 may execute communication for the device authentication with the RX 200. The communication for the device authentication may be executed by the second communication faster than the first communication.

The communication unit 104 receives a signal indicating a stop of power transmission (i.e., End Power Transfer packet (hereinafter, called as "EPT packet")) from the RX 200. The information indicating a reason for requesting a stop of power transmission and the information indicating a power transmission stop period or a power transmission start time may be included in the EPT packet. Examples where a stop of power transmission is requested include cases of when the temperature of the RX 200 exceeds the upper limit value, when charging is completed, when negotiation has failed, or when detection of an object different from the power reception apparatus (hereinafter, called as "foreign object") is requested.

The notification unit 106 notifies information to the user in an optional manner such as a visual, an auditory, or a haptic manner. For example, the notification unit 106 notifies the user about information such as a charging state of the TX 100 and a power transfer state of the wireless power transfer system. The notification unit 106 includes elements such as a display, a light-emitting diode (LED), a speaker, a vibration generation circuit, and the other notification devices. Any configuration is applicable to the notification unit 106 as long as the user can recognize execution or non-execution of power transmission. For example, an LED may serve as the notification unit 106, and green light is on when power transmission is executed, and red light is on when power transmission is not executed. Alternatively, an LED serving as the notification unit 106 may be turned on when power transmission is executed, and may blink on and off when power transmission is not executed. Yet alternatively, the notification unit 106 may notify the user about execution of power transmission by emitting light and non-execution of power transmission by generating sound.

The memory 107 stores various types of information such as information about each unit and the entirety of the wireless power transfer system and a control program. The memory 107 may store information acquired by a function unit different from the control unit 101.

The detection unit 108 detects at least one of a voltage value or a current value of the power transmission coil 105. Specifically, the detection unit 108 detects the voltage value and/or the current value of the power transmission coil 105 when the Analog Ping is transmitted in the Selection phase. The detection unit 108 also detects the voltage value and/or the current value of the power transmission coil 105 when a below-described signal for checking existence of the RX 200 is transmitted. Based on a detection result (i.e., detection value) acquired by the detection unit 108, the control unit 101 can detect that an object is placed on or removed from the charging table.

The timer 109 measures time using a count-up timer which measures an elapsed time from an activation time or a count-down timer which counts down from a set time. If the communication unit 104 receives the EPT packet indicating a stop of power transmission and the received EPT packet includes information about a power transmission stop period from the RX 200, the timer 109 sets the power transmission stop period and starts countdown.

The temperature sensor 110 measures the temperature of the TX 100. The control unit 101 determines appropriateness of power transmission based on the temperature measured by the temperature sensor 110. For example, the control unit 101 compares an upper limit value of the temperature stored in the memory 107 and a value of the temperature measured by the temperature sensor 110, and controls the power transmission unit 103 to stop power transmission if the value measured by the temperature sensor 110 exceeds the upper limit value. The temperature of the TX 100 may be increased when a large amount of power is continuously transmitted for a long period of time, or when power is transmitted under the high-temperature environment such as an inside of a car parked under a hot weather in a daytime.

In FIG. 1, the control unit 101, the power source unit 102, the power transmission unit 103, the communication unit 104, the memory 107, and the timer 109 are illustrated as separate units. However, some of these units may be optionally mounted on a same chip.

Figure 2:
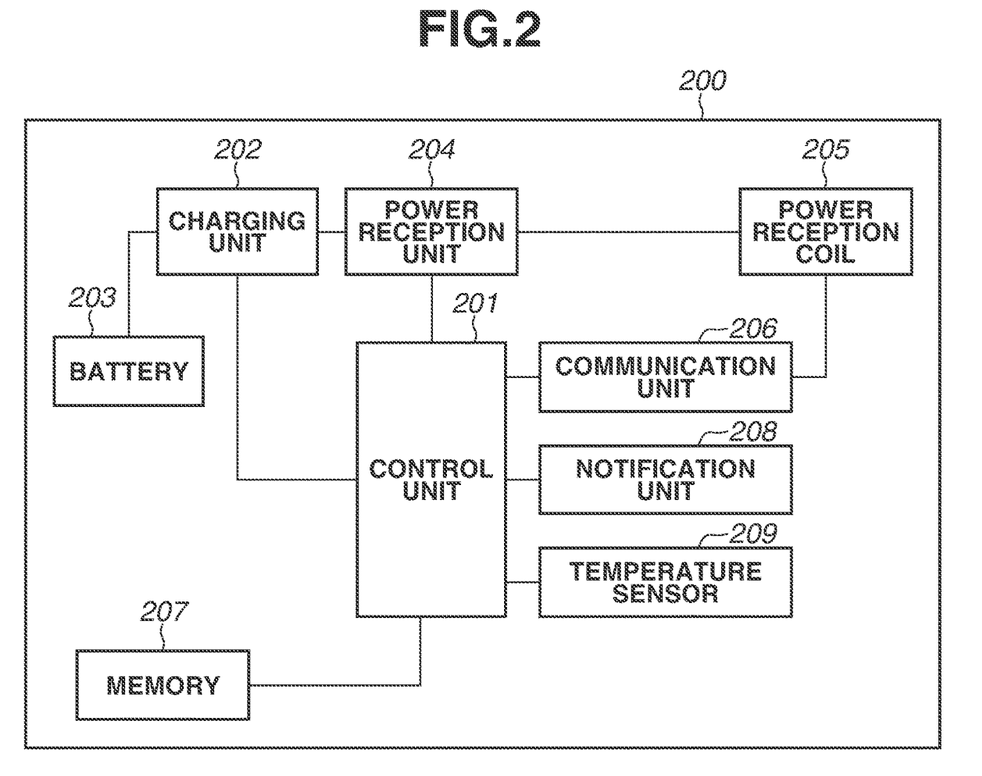
FIG. 2 is a block diagram illustrating a configuration example of a power reception apparatus according to one example embodiment.

FIG. 2 is a block diagram illustrating a configuration example of the RX 200 according to the present example embodiment. The RX 200 includes a control unit 201, a charging unit 202, a battery 203, a power reception unit 204, a power reception coil 205, a communication unit 206, a memory 207, a notification unit 208, and a temperature sensor 209. In addition, the RX 200 may further include an authentication unit for executing device authentication.

For example, the control unit 201 controls the entirety of the RX 200 by executing a control program stored in the memory 207. In other words, the control unit 201 controls each of the units illustrated in FIG. 2. Further, the control unit 201 may execute control relating to power reception control including communication for the device authentication executed by the RX 200. The control unit 201 may also execute control for executing an application other than the wireless power transfer application. For example, the control unit 201 includes one or more processors such as a CPU and an MPU. The control unit 201 may be configured of hardware dedicated to specific processing such as an application specific integrated circuit (ASIC). The control unit 201 may also include an array circuit such as the FPGA complied to execute predetermined processing. The control unit 201 stores information that should be stored while executing the various types of processing in the memory 207.

The charging unit 202 charges the battery 203 by using power supplied from the below-described power reception unit 204.

The battery 203 supplies power necessary for the control unit 201 to control each of the units of the RX 200 and to execute power reception and communication. The battery 203 is charged with power received by the charging unit 202 via the power reception coil 205.

Because of an electromagnetic wave emitted from the power transmission coil 105 of the TX 100, induced electromotive power is generated in the power reception coil 205, and the power reception unit 204 acquires the power generated in the power reception coil 205. The power reception unit 204 acquires alternate-current power generated by the electromagnetic induction in the power reception coil 205. Then, the power reception unit 204 converts the alternate-current power to a direct-current power or an alternate-current power of a predetermined frequency, and outputs the power to the charging unit 202 for executing processing for charging the battery 203. The above-described GP represents an amount of power guaranteed to be output from the power reception unit 204.

The communication unit 206 executes control communication compliant with the above-described WPC standard with the TX 100. The communication unit 206 demodulates the electromagnetic wave received from the power reception coil 205 to acquire the information transmitted from the TX 100, executes load modulation of the electromagnetic wave to superimpose the information to be transmitted to the TX 100 on the electromagnetic wave, and executes the first communication with the TX 100. In other words, in the first communication executed by the communication unit 206, the information is superimposed on the electromagnetic wave transmitted from the power transmission coil 105 of the TX 100.

The communication unit 206 may execute the second communication by using a communication antenna (not illustrated). As described above, in the second communication, communication is executed at a speed higher than that of the first communication. Specifically, a frequency range of the electromagnetic wave for the second communication is higher than that of the electromagnetic wave for the first communication. The communication unit 206 may have a modulation/demodulation circuit or a communication protocol processing function to execute communication compliant with the BLE standard.

The communication unit 206 may execute communication for the device authentication with the TX 100. The communication for the device authentication may be executed by the second communication faster than the first communication.

The communication unit 206 transmits an EPT packet indicating a stop of power transmission to the TX 100. The information indicating a reason for requesting a stop of power transmission and the information indicating a power transmission stop period may be included in the EPT packet. A stop of power transmission is requested when the temperature of the RX 200 exceeds the upper limit value, when charging is completed, when negotiation has failed, or when detection of an object different from the power reception apparatus (hereinafter, called as "foreign object") is requested.

As described above, the memory 207 stores various types of information such as identification information and device configuration information and a control program. The memory 207 may store the information acquired by a function unit different from the control unit 101.

The notification unit 208 notifies information to the user in an optional manner such as a visual, an auditory, or a haptic manner. For example, the notification unit 208 notifies the user about information such as a charging state of the RX 200 and a power transfer state of the wireless power transfer system. The notification unit 208 includes elements such as a display, an LED, a speaker, a vibration generation circuit, and the other notification devices. Any configuration is applicable to the notification unit 208 as long as the user can recognize execution or non-execution of power reception. For example, an LED may serve as the notification unit 208, and green light is on when power reception is executed, and red light is on when power reception is not executed. An LED serving as the notification unit 208 may be turned on when power reception is executed, and may blink on and off when power reception is not executed. Yet alternatively, the notification unit 208 may notify the user about execution of power reception by emitting light and non-execution of power reception by generating sound.

The temperature sensor 209 measures the temperature of the RX 200. The control unit 201 determines whether to transmit the EPT packet based on the temperature measured by the temperature sensor 209. For example, the control unit 201 compares an upper limit value of the temperature stored in the memory 207 and a value of the temperature measured by the temperature sensor 209, and controls the communication unit 206 to transmit the EPT packet if the value measured by the temperature sensor 209 exceeds the upper limit value. The temperature of the RX 200 may be increased when a large amount of power is continuously received for a long period of time, or when power is received under the high-temperature environment such as an inside of a car parked under a hot weather in a daytime.

In FIG. 2, the control unit 201, the charging unit 202, the power reception unit 204, the communication unit 206, and the memory 207 are illustrated as separate units. However, some of these units may be optionally mounted on a same chip.

<Processing Flow>

In the present example embodiment, when the TX 100 receives an EPT packet including the information specifying a power transmission stop period, the TX 100 transmits a signal (hereinafter, called as "checking signal") for checking existence of the RX 200. With this processing, the TX 100 can quickly detects non-existence of the RX 200 when the RX 200 is removed. This enables the TX 100 to quickly return to the Selection phase.

Figure 4:
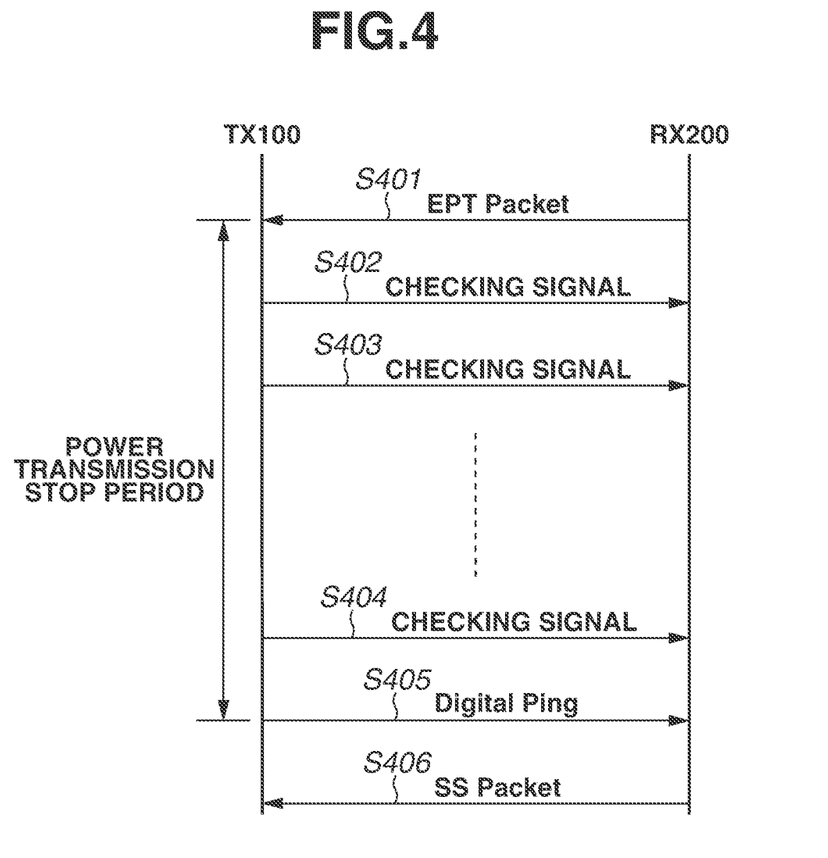
FIG. 4 is a diagram illustrating an example of a sequence of processing, according to one example embodiment, which is executed when a power reception apparatus is not removed.
Figure 5:
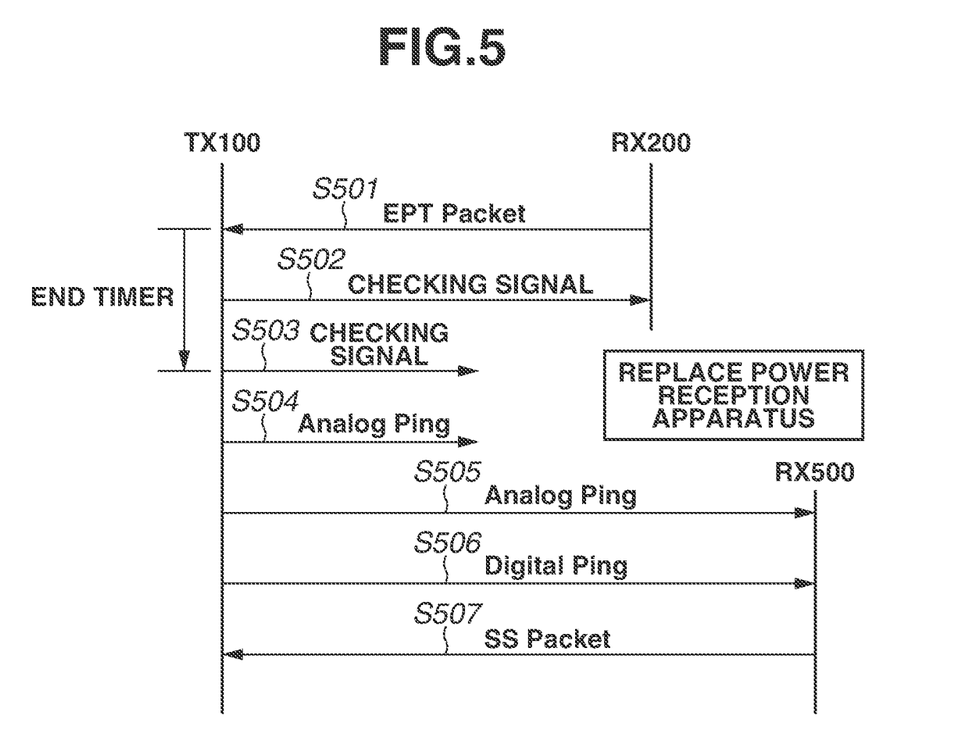
FIG. 5 is a diagram illustrating an example of a sequence of processing, according to one example embodiment, which is executed when a power reception apparatus is removed and a new power reception apparatus is placed.

In the present example embodiment, an example of the processing procedure executed by the TX 100 and the RX 200 will be described with reference to FIGS. 4 and 5. FIG. 4 is a sequence diagram illustrating a sequence of processing executed by the power transmission apparatus and the power reception apparatus in a case where the power reception apparatus is not removed from the charging table in the power transmission stop period. Meanwhile, FIG. 5 is a sequence diagram illustrating a sequence of processing executed by the power transmission apparatus and the power reception apparatus in a case where the power reception apparatus is removed from and a new power reception apparatus is placed on the charging table in the power transmission stop period.

First, the processing executed by the power transmission apparatus (TX 100) and the power reception apparatus (RX 200) in the power transmission stop period will be described with respect to the case where the power reception apparatus is not replaced. The sequence in FIG. 4 is started in a state where the power transmission apparatus (TX 100) and the power reception apparatus (RX 200) are in the Power Transfer phase. More specifically, the power transmission apparatus (TX 100) and the power reception apparatus (RX 200) have already gone through the Selection phase, the Ping phase, the I & C phase, the Negotiation phase, and the Calibration phase.

In step S401, the RX 200 transmits the EPT packet including the information specifying a power transmission stop period. In the present example embodiment, the period is specified as 10 seconds. However, the example embodiment is not limited thereto. As described above, the EPT packet is transmitted when the temperature of the RX 200 exceeds the upper limit value. The EPT packet can be also transmitted when the RX 200 detects abnormality other than abnormality in temperatures. For example, the EPT packet may be transmitted in a case where the RX 200 determines that a foreign object such as an NFC tag is placed on the charging table. When the TX 100 detects abnormality occurring in the TX 100, the TX 100 may also transmit a signal for requesting the RX 200 to transmit the EPT packet. The RX 200 may transmit the EPT packet based on reception of this signal. For example, abnormality in the TX 100 is detected when a temperature measured by the temperature sensor 110 exceeds the upper limit value.

When the above-described EPT packet is received by the communication unit 104, the TX 100 stops power transmitted from the power transmission unit 103, sets 10 seconds to the timer 109, and starts countdown.

In step S402, after one second from a start of countdown, the control unit 101 of the TX 100 controls the power transmission unit 103 and the power transmission coil 105 to transmit a checking signal. In this processing, the power of the checking signal is the same as the power of the Analog Ping transmitted in the above-described Selection phase.

The TX 100 detects at least one of the voltage value or the current value applied to the power transmission coil 105 when transmission of the checking signal is executed. The TX 100 executes the above detection to detect removal of the RX 200 by detecting a change in the voltage or the current applied to the power transmission coil 105 between a case of when the RX 200 is placed on the charging table and a case of when the RX 200 is removed. The TX 100 determines that the RX 200 is placed on the charging table because a difference between the detection value and a detection value acquired when the object (i.e., RX 200) is detected in the Selection phase (hereinafter, called as "reference detection value") falls within a predetermined range. The above-described determination can be performed based on that the power of the checking signal is equivalent to the power of the Analog Ping. In addition, the reference detection value is stored in the memory 107. The Analog Ping does not have to be transmitted after one second from a start of countdown. For example, the transmission timing of the Analog Ping may be set by the user.

Although details will not be described in the present example embodiment, for example, if information indicating a request of foreign object detection is included in the EPT packet, the TX 100 executes foreign object detection by a known method.

In step S403, the control unit 101 of the TX 100 controls the power transmission unit 103 and the power transmission coil 105 to transmit the checking signal after 2 seconds from the start of countdown. The TX 100 detects at least one of the voltage value or the current value applied to the power transmission coil 105 when transmission of the checking signal is executed. Then, the TX 100 determines that the RX 200 is placed on the charging table because a difference between the detection value and the reference detection value falls within a predetermined range.

The checking signal is similarly transmitted every second. In addition, a transmission interval of the checking signal may be shorter than or longer than one second. The transmission interval of the checking signal may be set by the user. Further, the checking signal may be transmitted periodically or non-periodically.

In step S404, after 10 seconds from the start of countdown, the control unit 101 of the TX 100 controls the power transmission unit 103 and the power transmission coil 105 to transmit the checking signal. The TX 100 detects at least one of the voltage value or the current value applied to the power transmission coil 105 when transmission of the checking signal is executed. Then, the TX 100 determines that the RX 200 is placed on the charging table because a difference between the detection value and the reference detection value falls within a predetermined range.

In step S405, after the TX 100 determines that the RX 200 is placed on the charging table, the control unit 101 of the TX 100 controls the power transmission unit 103 to transmit the Digital Ping.

In step S406, in order to respond to the Digital Ping, the RX 200 transmits an SS packet. Thereafter, the TX 100 and the RX 200 go through the above-described Ping phase, the I & C phase, the Negotiation phase, and the Calibration phase again to shift to the Power Transfer phase.

In addition, in step S406, the RX 200 can transmit the EPT packet instead of the SS packet. If the information specifying a power transmission stop period is included in the EPT packet, the processing returns to step S402 again. If the information specifying a power transmission stop period is not included in the EPT packet, the phase is shifted to the Selection phase.

FIG. 5 is a sequence diagram illustrating the processing executed by the power transmission apparatus (TX 100) and the power reception apparatus (RX 200 (500)) in a case where the power reception apparatus is removed from and a new power reception apparatus is placed on the charging table in the power transmission stop period. Specifically, an RX 500 is placed on the charging table of the TX 100 after the RX 200 is removed from the charging table. The RX 500 is a power reception apparatus having a configuration similar to that of the RX 200 described above. Detailed description of the sequence similar to the sequence illustrated in FIG. 4 will be omitted. Similar to the sequence in FIG. 4, the sequence in FIG. 5 is started in a state where the power transmission apparatus (TX 100) and the power reception apparatus (RX 200) are in the Power Transfer phase.

Similar to the processing in step S401, in step S501, the RX 200 transmits an EPT packet including the information specifying a power transmission stop period. When the EPT packet is received by the communication unit 104, the TX 100 stops power transmitted from the power transmission unit 103, sets 10 seconds to the timer 109, and starts countdown.

Similar to the processing in step S402, in step S502, after one second from a start of countdown, the control unit 101 of the TX 100 controls the power transmission unit 103 and the power transmission coil 105 to transmit a checking signal. The TX 100 detects at least one of the voltage value or the current value applied to the power transmission coil 105 when transmission of the checking signal is executed. Then, the TX 100 determines that the RX 200 is placed on the charging table because a difference between the detection value and the reference detection value falls within a predetermined range.

The below-described processing will be executed if the RX 200 is removed from the charging table before a next checking signal is transmitted after the transmission in step S502.

In step S503, after two seconds from the start of countdown, the control unit 101 of the TX 100 controls the power transmission unit 103 and the power transmission coil 105 to transmit a checking signal. The TX 100 detects at least one of the voltage value or the current value applied to the power transmission coil 105 when transmission of the checking signal is executed. However, because the RX 200 is removed from the charging table, the detection value detected by the TX 100 is changed. Specifically, a difference between the detection value and the reference detection value exceeds the predetermined range. As a result, the TX 100 determines that the RX 200 is not placed on the charging table, and forcibly stops the timer 109 to stop the countdown operation. Then, transmission of the checking signal is stopped.

In step S504, the TX 100 returns to the Selection phase, and the control unit 101 of the TX 100 controls the power transmission unit 103 and the power transmission coil 105 to transmit the Analog Ping. Then, the TX 100 detects at least one of the voltage value or the current value applied to the power transmission coil 105 when transmission of the Analog Ping is executed. The TX 100 determines that the object is not placed on the charging table because a difference between the detection value and a detection value acquired when the object is not placed on the charging table falls within a predetermined range.

The below-described processing will be executed if the RX 500 is placed on the charging table of the TX 100 before a next Analog Ping is transmitted after the transmission in step S504.

In step S505, the control unit 101 of the TX 100 controls the power transmission unit 103 and the power transmission coil 105 to transmit the Analog Ping. Then, the TX 100 detects at least one of the voltage value or the current value applied to the power transmission coil 105 when transmission of the Analog Ping is executed. The TX 100 determines that the object is placed on the charging table because a difference between the detection value and the detection value acquired when the object is not placed on the charging table exceeds the predetermined range.

Next, in step S506, the TX 100 transmits the Digital Ping.

In step S507, in order to respond to the Digital Ping, the RX 500 transmits an SS packet. Thereafter, the TX 100 and the RX 500 go through the above-described Ping phase, the I & C phase, the Negotiation phase, and the Calibration phase again to shift to the Power Transfer phase.

As described above, when the EPT packet including the information specifying a power transmission stop period is received, the TX 100 transmits a checking signal for checking existence of the RX 200 while operating the timer 109. In this way, the TX 100 can quickly detect non-existence of the RX 200, i.e., removal of the RX 200.

Even while the timer 109 is operating, the TX 100 forcibly ends the operation of the timer 109 and shifts to the normal Selection phase in a case where the TX 100 does not detect the object. With this configuration, when the power reception apparatus is replaced in the power transmission stop period specified by the EPT packet, a control sequence relating to power transfer is quickly started with respect to the power reception apparatus newly placed on the charging table (i.e., RX 500), so that time taken to start transmitting power can be shortened.

<Flowchart Illustrating Processing of Power Transmission Apparatus>

Figure 6:
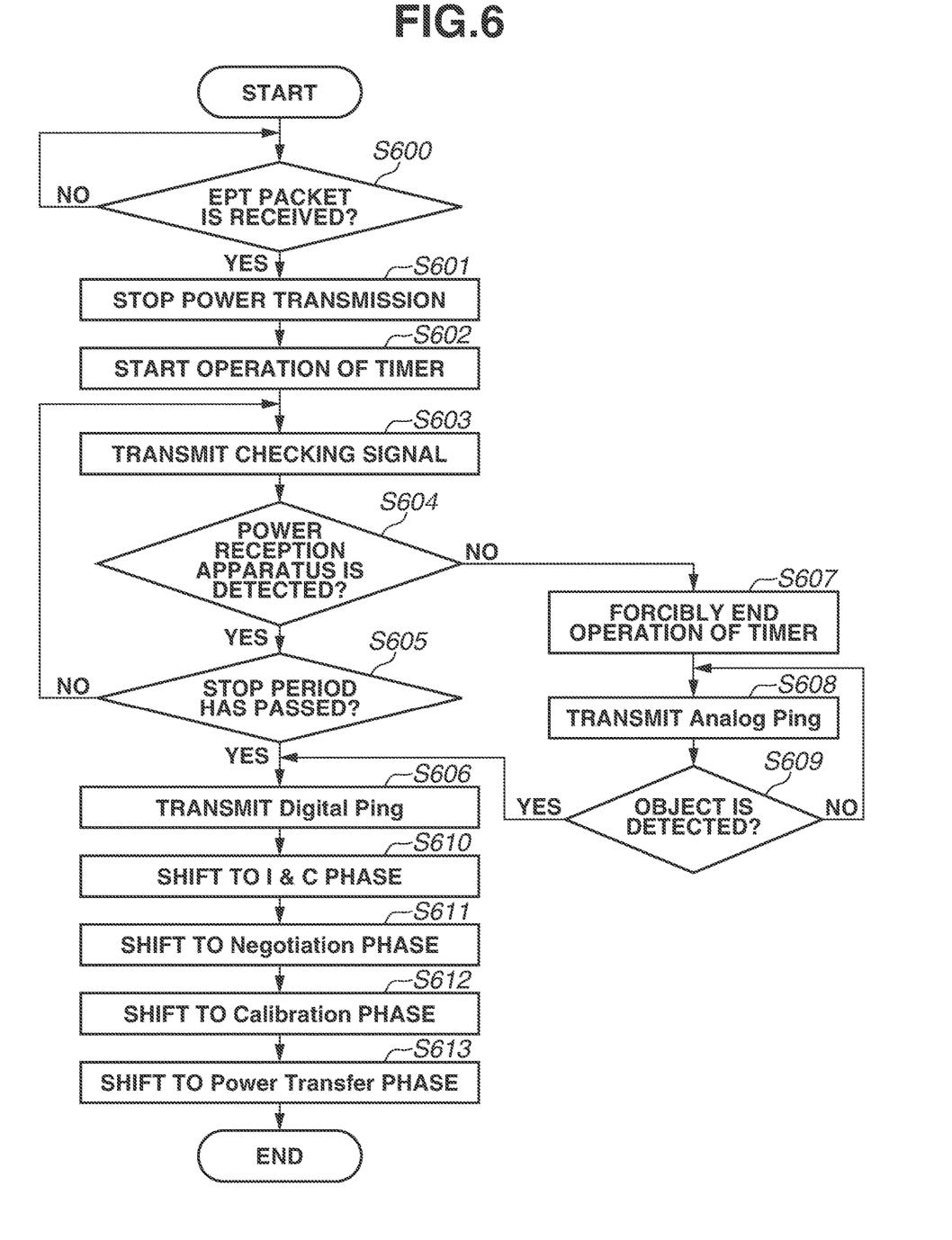
FIG. 6 is a flowchart illustrating an example of processing executed by the power transmission apparatus according to one example embodiment.

Hereinafter, the processing executed by the TX 100 when the EPT packet is received will be described. FIG. 6 is a flowchart illustrating the processing.

In step S600, the control unit 101 of the TX 100 determines whether the EPT packet is received by the communication unit 104. If the communication unit 104 receives the EPT packet (YES in step S600), the processing proceeds to step S601. If the communication unit 104 does not receive the EPT packet (NO in step S600), the control unit 101 remains in the Power Transfer phase and executes the determination in step S600.

If the control unit 101 of the TX 100 determines that the EPT packet is received by the communication unit 104 (YES in step S600), the processing proceeds to step S601. In step S601, the control unit 101 controls the power transmission unit 103 and the power transmission coil 105 to stop power transmission.

In step S602, the control unit 101 sets the timer 109 based on the power transmission stop period specified by the EPT packet and starts countdown operation of the timer 109.

In step S603, the control unit 101 controls the power transmission unit 103 and the power transmission coil 105 to transmit the checking signal at a predetermined interval.

In step S604, the control unit 101 determines whether an object is placed on the charging table of the TX 100. Specifically, the determination is executed as follows. First, the control unit 101 detects at least one of the voltage value or the current value of the power transmission coil 105. Next, the control unit 101 compares the detection value with the reference detection value stored in the memory 107. If a difference between the detection value and the reference detection value falls within a predetermined range (YES in step S604), the control unit 101 determines that the RX 200 is still placed on the charging table, and the processing proceeds to step S605. Meanwhile, if a difference between the detection value and the reference detection value exceeds the predetermined range (NO in step S604), the control unit 101 determines that the RX 200 is removed from the charging table, and the processing proceeds to step S607.

In step S605, the control unit 101 determines whether the power transmission stop period set to the timer 109 has passed. If the power transmission stop period has not passed (NO in step S605), the processing returns to step S603. Meanwhile, if the power transmission stop period has passed (YES in step S605), the processing proceeds to step S606.

In step S607, the control unit 101 forcibly ends the countdown operation of the timer 109.

In step S608, the control unit 101 controls the power transmission unit 103 to transmit the Analog Ping at a predetermined transmission interval.

In step S609, the control unit 101 determines whether the object is placed on the charging table of the TX 100. Specifically, the determination is executed as follows. First, the control unit 101 detects at least one of the voltage value or the current value of the power transmission coil 105. Next, the control unit 101 compares the detection value with the detection value stored in the memory 107, acquired when the object is not placed. If the difference exceeds a predetermined range (YES in step S609), the control unit 101 determines that the object is placed on the charging table, and the processing proceeds to step S606. Meanwhile, if the difference falls within the predetermined range (NO in step S609), the control unit 101 determines that the object is not placed on the charging table, and the processing returns to step S608.

In step S606, the control unit 101 controls the power transmission unit 103 to transmit the Digital Ping. Thereafter, the TX 100 shifts to the I & C phase in step S610 when the SS packet transmitted from the RX 200 or the RX 500 is received.

Then, the TX 100 shifts to the I & C phase in step S610, the Negotiation phase in step S611, the Calibration phase in step S612, and the Power Transfer phase in step S613. For example, the power Transfer phase is ended when a battery of the RX 200 or the RX 500 is charged. The processing already described above should be executed in the I & C phase, the Negotiation phase, the Calibration phase, and the Power Transfer phase, so that description thereof will be omitted.

<Other Example Embodiments>
<Checking Signal>

Although the example embodiment in which the power of the above-described checking signal is the same as the power of the Analog Ping has been described, the example embodiment is not limited thereto. The power of the checking signal may be smaller or greater than the power of the Analog Ping. Further, the power of the checking signal may be equivalent to the power of the Digital Ping. The power of the checking signal is smaller than the power in the Power Transfer phase. In other words, because the battery 203 is charged based on the power received by the RX 200, the power of the checking signal is smaller than the power transmitted from the TX 100.

If the power of the checking signal is equivalent to the power of the Analog Ping or the Digital Ping, power setting can be simplified.

In the above-described example embodiment, the transmission interval of the checking signal may be the same as or different from the transmission interval of the Analog Ping in the Selection phase. For example, in FIG. 5, a time interval between steps S502 and S503 may be the same as or different from a time interval between steps S503 and S504 or a time interval between steps S504 and S505.

If the transmission interval of the Analog Ping in the Selection phase is set to be shorter than the transmission interval of the checking signal, a new power reception apparatus (RX 500) can be detected quickly when the power reception apparatus is replaced as illustrated in FIG. 5.

If the transmission interval of the checking signal is set to be shorter than the transmission interval of the Analog Ping in the Selection phase, removal of the power reception apparatus can be detected quickly, so that the TX 100 can quickly shift to the Selection phase.

<Determination of Removal of Power Reception Apparatus>

In a case where the power of the checking signal is different from the power of the Analog Ping, the TX 100 can execute the following processing in order to detect removal of the RX 200. First, when the fist transmission of the checking signal is executed in step S402 or S502, the TX 100 detects at least one of the voltage value or the current value of the power transmission coil 105 and stores the detection value in the memory 107 as a reference detection value. Then, the TX 100 detects at least one of the voltage value or the current value of the power transmission coil 105 at the second transmission and the following transmission of the checking signal. Then, the TX 100 compares the detection value with the above-described reference detection value, and determines that the RX 200 is removed if the difference exceeds a predetermined range. Meanwhile, if the difference falls within the predetermined range, the TX 100 determines that the RX 200 is placed on the charging table.

The reference detection value as a reference for determining removal of the power reception apparatus may be a detection value of one of the voltage value or the current value of the power transmission coil 105 acquired in a state where the object is not placed on the charging table. Then, by comparing a detection value at the time of transmitting the checking signal with this reference detection value, the TX 100 may determine that the RX 200 is placed on the charging table if the difference exceeds the predetermined range, and may determine that the RX 200 is removed from the charging table if the difference falls within the predetermined range. In this case, because the processing is similar to the normal object detection processing using the Analog Ping, contents of the processing can be simplified.

<Detection of Replacement of Power Reception Apparatus>

In the above-described example embodiment, placement of the RX 500 is determined after removal of the RX 200 is determined. However, there is a possibility that replacement of the power reception apparatus cannot be detected if the apparatus is replaced within a period shorter than a transmission interval of the checking signal. Therefore, first, the TX 100 detects at least one of the voltage value or the current value of the power transmission coil 105 when the first transmission of the checking signal is executed in step S402 or S502, and stores the detection value in the memory 107 as a reference detection value. Then, the TX 100 detects at least one of the voltage value or the current value of the power transmission coil 105 at the second transmission and the following transmission of the checking signal. Then, the TX 100 compares the detection value with the above-described reference detection value, and determines that the RX 200 is replaced with the RX 500 when the difference exceeds a predetermined range. In this case, removal of the RX 200 and placement of the RX 500 can be determined simultaneously.

The present disclosure can be also realized through a method in which a program for realizing one or more functions according to the above-described example embodiments is supplied to a system or an apparatus via a network or a storage medium, and one or more processors in the system or the apparatus read and execute the program. Further, the present disclosure can be also realized with a circuit (e.g., ASIC) that realizes one or more functions.

In addition, at least a part of the processing illustrated in the flowchart in FIG. 6 may be realized with hardware. In a case where the above-described processing is realized with hardware, for example, a dedicated circuit may be generated on the FPGA from a program for realizing the respective pieces of processing by using a predetermined compiler. The above-described processing may be realized as hardware by forming a gate array circuit similar to the FPGA.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to various embodiments of the example embodiments, a power transmission apparatus that receives a signal, indicating a stop of power transmission, which specifies a power transmission stop period can detect removal of a power reception apparatus even in a period when power transmission is stopped.

While the present disclosure has been described with reference to example embodiments, it is to be understood that the invention is not limited to the disclosed example embodiments. The scope of the following claims is to be accorded the broadest interpretation so as to encompass all such modifications and equivalent structures and functions.

What is claimed is:

1. A power transmission apparatus wirelessly transmitting power, the power transmission apparatus comprising:
   a transmission unit configured to transmit a signal; and
   a detection unit configured to perform processing for detecting an object,
   wherein
   the transmission unit transmits a second signal to wake up a power reception apparatus in a case where an object is detected by the detection unit after a first signal is transmitted by the transmission unit,
   the transmission unit transmits a third signal after the second signal is transmitted,
   the detection unit performs, after the third signal is transmitted, processing for detecting an object based on a parameter obtained when there is no object and a parameter obtained after the third signal is transmitted, and
   the transmission unit transmits the first signal in a case where an object is not detected by the detection unit after the third signal is transmitted.

2. The power transmission apparatus according to claim 1, wherein
   the transmission unit transmits the second signal, in a case where an object is not detected after the third signal is transmitted and in a case where an object is detected after the first signal is transmitted.

3. The power transmission apparatus according to claim 1, wherein
   the power is stopped while the transmission unit transmits the third signal.

4. The power transmission apparatus according to claim 1, wherein
   in a case where the object which is detected after the first signal is transmitted is a power reception apparatus, power to the power reception apparatus is transmitted.

5. The power transmission apparatus according to claim 1, wherein
   the second signal is a Digital Ping compliant with a standard of the Wireless Power Consortium.

6. The power transmission apparatus according to claim 1, wherein
   the first signal is an Analog Ping compliant with a standard of the Wireless Power Consortium.

7. The power transmission apparatus according to claim 1, wherein
   the third signal is a signal to check presence of a power reception apparatus that has requested to stop power transfer.

8. The power transmission apparatus according to claim 1, wherein
   the first signal and the third signal are intermittently transmitted.

9. The power transmission apparatus according to claim 8, wherein
   a transmission interval of the first signal is the same as a transmission interval of the third signal.

10. The power transmission apparatus according to claim 8, wherein
    a transmission interval of the first signal is different from a transmission interval of the third signal.

11. The power transmission apparatus according to claim 10, wherein
    a transmission interval of the first signal is shorter than a transmission interval of the third signal.

12. The power transmission apparatus according to claim 10, wherein
    a transmission interval of the third signal is longer than a transmission interval of the first signal.

13. The power transmission apparatus according to claim 1, wherein
    the third signal is a signal to detect removal of the object which is detected after the first signal is transmitted.

14. The power transmission apparatus according to claim 1, wherein the power transmission unit transmits the third signal again in a case where an object is detected after the third signal is transmitted.

15. A method for a power transmission apparatus wirelessly transmitting power, the method comprising:
  transmitting a first signal;
  performing processing for detecting an object after the first signal is transmitted;
  transmitting a second signal to wake up a power reception apparatus in a case where an object is detected after the first signal is transmitted;
  transmitting a third signal after the second signal is transmitted;
  performing, after the third signal is transmitted, processing for detecting an object based on a parameter obtained when there is no object and a parameter obtained after the third signal is transmitted; and
  transmitting the first signal in a case where an object is not detected after the third signal is transmitted.

16. A non-transitory computer-readable storage medium storing a program causing a computer to execute a method for a power transmission apparatus that wirelessly transmits power, the method comprising:
  transmitting a first signal;
  performing processing for detecting an object after the first signal is transmitted;
  transmitting a second signal to wake up a power reception apparatus in a case where an object is detected after the first signal is transmitted;
  transmitting a third signal after the second signal is transmitted; and
  performing, after the third signal is transmitted, processing for detecting an object based on a parameter obtained when there is no object and a parameter obtained after the third signal is transmitted; and
  transmitting the first signal in a case where an object is not detected after the third signal is transmitted.

\* \* \* \* \*